Oct. 26, 1965  T. A. NELSON ETAL  3,213,764
DAMPED BELLOWS CONSTRUCTION
Filed Nov. 27, 1963

INVENTORS
THOMAS A. NELSON
RALPH L. BURLINGAME
BY
*William S. Thompson*
ATTORNEY United States Patent Office 3,213,764
Patented Oct. 26, 1965

3,213,764
DAMPED BELLOWS CONSTRUCTION
Thomas A. Nelson and Ralph L. Burlingame, South Bend, Ind., assignors to The Bendix Corporation, South Bend, Ind., a corporation of Delaware
Filed Nov. 27, 1963, Ser. No. 326,485
4 Claims. (Cl. 92—41)

The present invention relates to a damped bellows construction particularly adapted for use as an engine control component.

Metal bellows associated with engine control equipment are often subjected to vibration transmitted through the engine and control housing or vehicle frame which adversely affects bellows performance and life. This problem is particularly acute in aircraft installations which require high reliability and high sensitivity or gain between bellows input and output quantities. Further, bellows in such installations are subjected to wide temperature extremes and often immersed in engine fuel or oil which places further restrictions on bellows design.

It is an object of the present invention to provide a coated bellows wherein the coating material absorbs vibration energy and thereby effectively dampens the bellows while not adversely affecting the normal bellows load vs. displacement characteristic.

It is another object of the present invention to provide a coated dampened bellows capable of operation through a temperature range of −65 to +300° F. while immersed in fuel for use in aircraft control applications.

Other objects and advantages of the present invention will be apparent on consideration of the accompanying description and drawings wherein.

Figure 1:
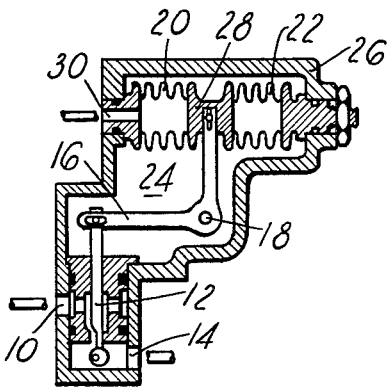
FIGURE 1 is a schematic view of a typical bellows application in which the bellows of the present invention is particularly useful.

FIGURE 1 illustrates a typical fuel control bellows installation for an aircraft fuel control wherein high pressure fuel is supplied by inlet passage 10 to metering valve 12. Fuel passes through the restricted opening of the metering valve into conduit 14 where it is adapted to be transmitted to the engine. The valve 12 is axially movable and is positioned by bell crank 16 pivoted at 18. A pair of metal bellows 20 and 22 having convoluted walls are mounted in a chamber 24 formed by a housing 26. The bellows have their free ends joined by the common end plate 28 which is pivoted to bell crank 16 to control the movement of valve 12. A control signal pressure may be supplied to the interior of bellows 20 by means of passage 30. Bellows 22 is evacuated and sealed. In the installation shown, fuel passing from inlet 10 to outlet 14 will leak past the valve 12 into chamber 24. The pressure effect of such leakage fuel on the bellows is cancelled or neutralized by constructing the bellows of equal size. Normally leakage fuel is continually drained off and returned to the fuel tank or pump inlet for recirculation.

Figure 2:
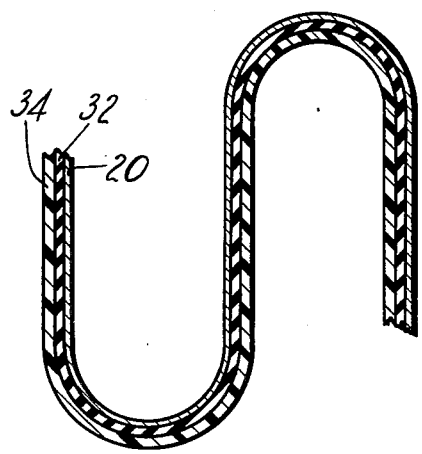
FIGURE 2 is a bellows wall segment showing the relative disposition of the coatings.

In the installation shown the bellows performance and life are adversely affected by vibration transmitted from the engine or other vibrating sources. This detrimental effect is particularly pronounced for metal bellows which have high resiliency and therefore efficiently store and then return vibration energy similar to an oscillating spring or swinging pendulum and have very low capability to dissipate vibration energy and thus suppress the vibration. To increase bellows life and improve performance by reducing the resonant amplitude build-up of vibration the bellows of this invention is coated with a first bonded layer of viscoelastic material 32, FIGURE 2, and a secondary constraining layer 34 of stiffer material as more fully described below.

Functionally the primary viscoelastic layer 32 absorbs resonant vibration energy from the bellows wall. The secondary constraining layer 34 acts as a stiffener to the primary layer which results in an increase in the energy absorbing capability of the primary layer. The secondary layer also performs a function as a barrier to aromatic atmospheres and liquids such as fuel to protect the primary coat.

The primary viscoelastic layer requires force to deform it. The application of such a force, as supplied by a convoluted bellows wall during vibration, requires energy. This energy is dissipated primarily in the form of heat and, therefore, cannot be stored and returned as a force to the bellows. Consequently when the convolutions of a bellows are caused to move as a result of a vibratory environmental input, such motion also deforms the bonded viscoelastic layer which then absorbs a part of the energy of motion. As indicated, this absorbed energy cannot be returned to the vibrating bellows and as a consequence, the magnitude of a resonant amplitude build-up is reduced—thereby reducing the magnitude of stress reversals of the bellows convolutions. Bellows convolution fatigue is decreased with consequent increase in bellows life. In addition, this decrease in magnitude of resonant vibratory build-up permits higher environmental input vibratory levels.

A main part of the energy absorbing capability is derived from a shearing action in the primary viscoelastic layer. The constraining secondary layer acts as a stiffener in part. This stiffening action forces the viscoelastic layer to absorb a greater amount of energy by providing a second surface confining the viscoelastic layer.

There are a number of materials having viscoelastic properties which may be used with varying degrees of effectiveness among the plastics, synthetic rubbers, and natural rubbers. A particularly suitable viscoelastic material for use on a metal bellows is butyl rubber. Butyl rubber possesses a high percentage of dampening, or conversely stated, low resiliency such that only a small portion of the applied stresses are recoverable and a major portion is absorbed through permanent deformation of the material. Then energy absorbing ability or percentage of dampening of butyl rubber is greater than 65% measured at 26° C. which is the primary characteristic of the material in the present invention. Additional advantages of butyl rubber are that it can be effectively bonded to common metal bellows, and can be suitably prepared for controlled process application. A successful application approach has been to dissolve the butyl rubber in a solvent to a consistency or viscosity which permits the use of spray gun application. Very thin controllable layer thickness may then be built up until the desired thickness is obtained. Usable butyl rubber dampening effects may be obtained over a wide temperature range, from −65° F. to +300° F. which meets normal aircraft control requirements.

The primary disadvantage of butyl rubber is that it is not resistant to aromatic liquids such as fuel, however, this is not a detriment in the present invention wherein the secondary stiffening coat may serve the function as a protective barrier.

The secondary layer is a resin-rubber mixture preferably comprised of a resin of the phenol-aldehyde classification and fuel and oil resistant acrylonitrile butadiene rubber, American Society of Testing Materials Classification: NBR.

The resin constitutent of this mixture provides the stiffening characteristic while the rubber permits deformation necessary for a long lasting bond and minimum effect on the bellows deformation characteristic. The proportion of resin to rubber is not critical. Standard commercially available organic brake shoe bonding compounds have been used with success or the materials may be specially blended to obtain an optimum balance between stiffness and bonding capability for a given application.

The resin-rubber mixture is usable over approximately the same temperature range as butyl rubber. It possesses aromatic atmosphere and liquid resistant characteristics which are desirable in a secondary layer when butyl rubber is used as the viscoelastic layer. Furthermore it may be sprayed on in a manner similar to butyl rubber so that layer thickness may be accurately controlled. It bonds effectively to butyl rubber and has good mechanical abrasion resistant qualities. It additionally has a minimum effect on the deformation characteristic of the original uncoated bellows.

Figure 3:
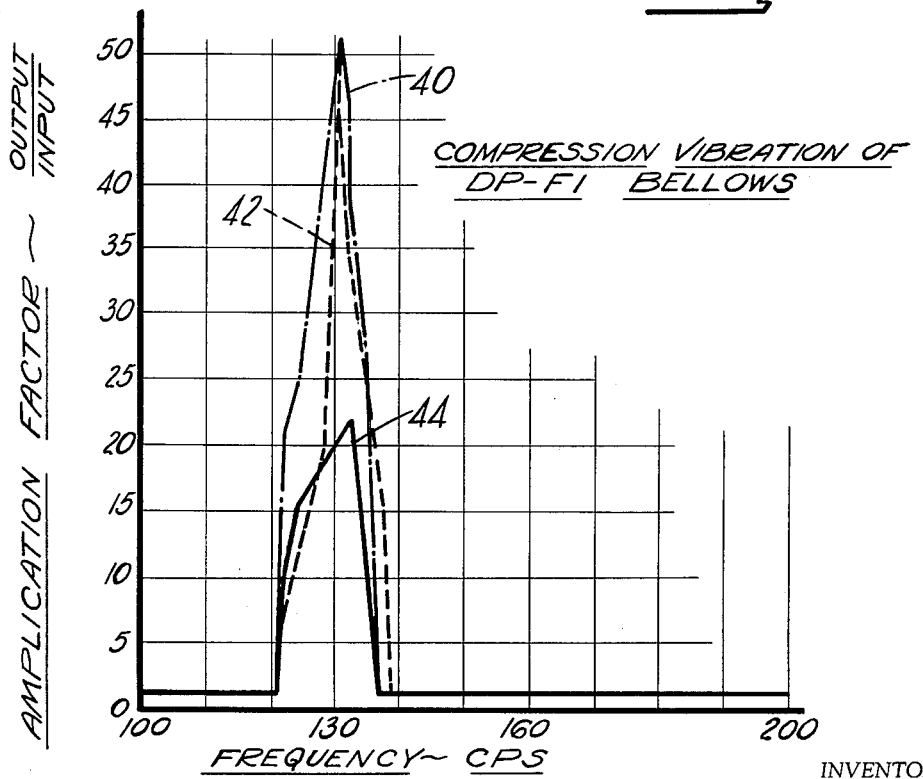
FIGURE 3 is a curve based on test data showing the degree of damping obtained at the maximum vibration amplitude of the bellows.

The damping effectiveness of our bellows construction is illustrated in the graph of FIGURE 3 showing comparative test results between uncoated and coated bellows. The abscissa of the graph is frequency of applied or input vibration whereas the ordinate is a dimensionless ratio of output to input vibration amplitude or amplification factor. The vibration input was controlled to a constant ±.5G sinusoidal input where G is expressed by the equation:

$$G = .0511 D f^2$$

where D is total displacement from peak to peak of the sine wave (full wave displacement) and $f$ is frequency in cycles per second.

First, a scan of frequencies were applied to the uncoated bellows to determine its maximum resonant vibrating frequency. This occurred at 130 c.p.s. Curve 40 is a plot of the output to input displacement ratio versus frequency for a constant ±.5G vibration input in the range of maximum bellows vibration resonance for an uncoated bellows. At the point of maximum resonance, output displacement was over 50 times greater than input displacement.

Next a bellows having a single layer coating of a resin-rubber mixture was similarly tested with only slight reduction in output to input displacement ratio as indicated by the plot of curve 42 for a single layer coated bellows.

Lastly the test was repeated for a double layer coated bellows having a first layer of butyl rubber and a second layer of a resin-rubber mixture with results as plotted by curve 44. As indicated the displacement ratio was less than half that of the uncoated and single layer coated bellows.

In addition, comparative life tests of the three bellows were run by vibrating each bellows type at its worse resonant frequency until failure. The results of the life tests are tabulated as follows:

| Type of bellows Coating | Input "G" | | | | |
|---|---|---|---|---|---|
| | 1.5 | 2.0 | 3.0 | 4.0 | 5.0 |
| Noncoated | 4 hrs.* | | | | |
| Resin-Rubber | 40 hrs. | 60 hrs. | .5 hrs.* | | |
| Butyl and Resin-Rubber | 40 hrs. | 60 hrs. | 1.0 hr. | 1.0 hr. | 1.0 hr.* |

* At this point the bellows failed.

The left hand column indicated the bellows type. The five column extending to the right list in hours the time the bellows were vibrated at the G input indicated at the top of the column. The test began with a low G input and was increased progressively until the bellows failed. As indicated in the table the two layer coated bellows tolerated both a higher input vibration and for a longer period than either the uncoated or single layer coated bellows.

Other tests indicated that the two coat bellows had the least effect or change on the displacement or rate characteristic of the uncoated bellows indicating that existing bellows configurations could be coated without requiring a redesign of the bellows for most applications.

We claim:

1. A dampened bellows construction comprising: a metal bellows member having a convoluted wall of high resiliency capable of efficiently storing and returning vibration energy into the bellows construction when subjected to a vibrating environment, a first primary layer of viscoelastic material having an energy absorbing efficiency of greater than 65% bonded to said convoluted wall for absorbing a major portion of said vibration energy and preventing its return to the bellows construction, a second constraining layer of material having a stiffness greater than said viscoelastic material bonded to said first primary layer of viscoelastic material for increasing its energy absorbing effectiveness.

2. A dampened bellows construction comprising: a metal bellows member having a convoluted wall of high resiliency capable of efficiently storing and returning vibration energy into the bellows construction when subjected to a vibrating environment, a first primary layer of butyl rubber bonded to said convoluted wall for movement therewith operative to dissipate a major portion of said portion of said vibration energy in the form of heat and preventing its return to the bellows construction, a second constraining layer of material having a stiffness greater than said butyl rubber and bonded thereto, said second constraining layer operative to increase the energy absorbing effectiveness of said butyl rubber primary layer.

3. A dampened bellows construction comprising: a metal bellows member having a convoluted wall of high resiliency capable of efficiently storing and returning vibration energy into the bellows construction when subjected to a vibrating environment, a primary layer of butyl rubber bonded to said convoluted wall for movement therewith, said primary layer of butyl rubber operative to dissipate a major portion of said vibration energy and preventing its return to the bellows construction, a constraining layer of a resin-rubber mixture bonded to said primary layer of butyl rubber to increase its energy absorbing effectiveness.

4. A dampened bellows construction as claimed in claim 3 where said resin-rubber mixture of said constraining layer is comprised of phenol-aldehyde resin and NBR rubber to provide an outer layer resistant to aromatic liquids such as fuel, oil or the like.

No references cited.

RICHARD B. WILKINSON, *Primary Examiner.*